(12) United States Patent
Koike et al.

(10) Patent No.: US 11,890,789 B2
(45) Date of Patent: Feb. 6, 2024

(54) WEB FORMING APPARATUS AND MOLDED BODY MANUFACTURING APPARATUS

(71) Applicant: SEIKO EPSON CORPORATION, Tokyo (JP)

(72) Inventors: Hisashi Koike, Nagano (JP); Satomi Yoshioka, Nagano (JP); Akio Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/807,150

(22) Filed: Jun. 16, 2022

(65) Prior Publication Data

US 2022/0402175 A1    Dec. 22, 2022

(30) Foreign Application Priority Data

Jun. 18, 2021    (JP) ................................. 2021-101394

(51) Int. Cl.
*B29C 43/34*    (2006.01)
*B29C 43/24*    (2006.01)

(52) U.S. Cl.
CPC .............. *B29C 43/34* (2013.01); *B29C 43/24* (2013.01); *B29C 2043/3466* (2013.01); *B29C 2793/009* (2013.01)

(58) Field of Classification Search
CPC .......................... B29C 2043/3466; D21B 1/08
See application file for complete search history.

(56) References Cited

U.S. PATENT DOCUMENTS

| | | | | |
|---|---|---|---|---|
| 2014/0290887 A1* | 10/2014 | Gomi | ..................... | D21B 1/068 162/252 |
| 2015/0275429 A1* | 10/2015 | Higuchi | ................... | B27N 3/04 162/261 |
| 2015/0275430 A1 | 10/2015 | Higuchi et al. | | |
| 2016/0230338 A1 | 8/2016 | Nakamura et al. | | |
| 2019/0232606 A1* | 8/2019 | Ota | .......................... | D04H 1/54 |
| 2020/0307870 A1* | 10/2020 | Nakamura | ................ | D21F 9/00 |

FOREIGN PATENT DOCUMENTS

| | | | |
|---|---|---|---|
| CN | 104947489 A | | 9/2015 |
| CN | 107761255 A | * | 3/2018 |
| CN | 107761255 A | | 3/2018 |
| JP | 2015-066932 A | | 4/2015 |
| JP | 2018168479 A | * | 11/2018 ............. A01N 25/34 |

* cited by examiner

*Primary Examiner* — Alison L Hindenlang
*Assistant Examiner* — Virak Nguon
(74) *Attorney, Agent, or Firm* — Global IP Counselors, LLP (57) ABSTRACT

A web forming apparatus includes a drum portion and a second web forming unit. The drum portion has an accommodating chamber capable of accommodating fragments, and accommodating powder supplied from a first supplying unit. The second web forming unit forms a second web by letting a mixture containing the fragments and the powder falling from the drum portion accumulate. The first supplying unit includes a storing chamber for storing the powder and an outlet portion provided below the storing chamber. The powder goes out of the storing chamber via the outlet portion. The drum portion has meshes formed in a net demarcating the accommodating chamber. The powder is able to pass through the meshes. The outlet portion is provided vertically over the net of the drum portion.

9 Claims, 5 Drawing Sheets

WEB FORMING APPARATUS AND MOLDED BODY MANUFACTURING APPARATUS

The present application is based on, and claims priority from JP Application Serial Number 2021-101394, filed Jun. 18, 2021, the disclosure of which is hereby incorporated by reference herein in its entirety.

BACKGROUND

1. Technical Field

Embodiments of the present disclosure relate to a web forming apparatus and a molded body manufacturing apparatus.

2. Related Art

JP-A-2015-066932 discloses a sheet manufacturing apparatus in which a resin supplying unit configured to supply resin in a solid phase as an additive is provided on the path of a transportation portion configured to transport fibers having undergone defibration and in which the additive is transported in the horizontal direction toward a sieve capable of accommodating the additive and the fibers.

However, in the sheet manufacturing apparatus disclosed in JP-A-2015-066932, since the additive that is a solid is transported inside the transportation portion, there is a risk that the transportation portion might be damaged due to the contact of the additive with the inner surface of the transportation portion.

SUMMARY

A web forming apparatus according to a certain aspect of the present disclosure includes: a supplying unit that supplies powder; a drum portion that has an accommodating chamber configured to accommodate fibers, and accommodate the powder supplied from the supplying unit; and a web forming unit that forms a web by letting a mixture containing the fibers and the powder falling from the drum portion accumulate; wherein the supplying unit includes a storing chamber for storing the powder and an outlet portion provided below the storing chamber, the powder going out of the storing chamber via the outlet portion, the drum portion has through holes formed in a peripheral surface demarcating the accommodating chamber, the powder being configured to pass through the through holes, and the outlet portion is provided vertically over the peripheral surface of the drum portion, and the supplying unit supplies the powder to the accommodating chamber through the through holes by letting the powder fall from the outlet portion.

A molded body manufacturing apparatus according to a certain aspect of the present disclosure includes: the above web forming apparatus; and a molded body forming unit that forms a molded body containing the fibers by applying pressure and heat to the formed web.

DESCRIPTION OF EXEMPLARY EMBODIMENTS

Based on exemplary embodiments, the present disclosure will be presented below. In the figures, the same reference numerals are assigned to the same members, and the same explanation will not be given below.

In the figures, X, Y, and Z represent three spatial axes orthogonal to one another. In this specification, directions along these axes are defined as X, Y, and Z directions. When there is a need to specify its specific orientation, a plus or minus sign, "+" for a positive direction and "−" for a negative direction, will be used in combination with such axial denotation of direction. The direction indicated by an arrowhead in each figure will be described as a positive direction (+). The opposite direction will be described as a negative direction (−). The Z-axis direction represents the direction of gravity, wherein +Z denotes vertically downward, and −Z denotes vertically upward. A plane including the X axis and the Y axis will be described as an X-Y plane. A plane including the X axis and the Z axis will be described as an X-Z plane. A plane including the Y axis and the Z axis will be described as a Y-Z plane. The X-Y plane is a horizontal plane. The three X, Y, and Z spatial axes will be referred to as X, Y, and Z axes when their positive/negative directional polarities are not limited.

1. First Embodiment

The structure of a molded body manufacturing apparatus 500 according to a first embodiment will now be explained. The molded body manufacturing apparatus 500 is an apparatus suited for manufacturing new paper by defibrating a raw material, specifically, used waste paper, by dry defibration to fiberize the raw material, and by pressing and heating the fiberized material after the dry defibration and then cutting the pressed-and-heated material. To enhance the binding strength or the degree of whiteness of paper products or to add functionality such as color, flavor, or flame resistance, etc. thereto, various additives may be mixed into the fiberized material, depending on uses/applications. Moreover, it is possible to manufacture paper having various types of thickness and size and a molded body to be used for liquid absorption, etc., for example, A4-sized or A3-sized office-use paper, business-card paper, etc., by performing molding while controlling paper density, paper thickness, and paper shape, depending on uses/applications.

Figure 1:
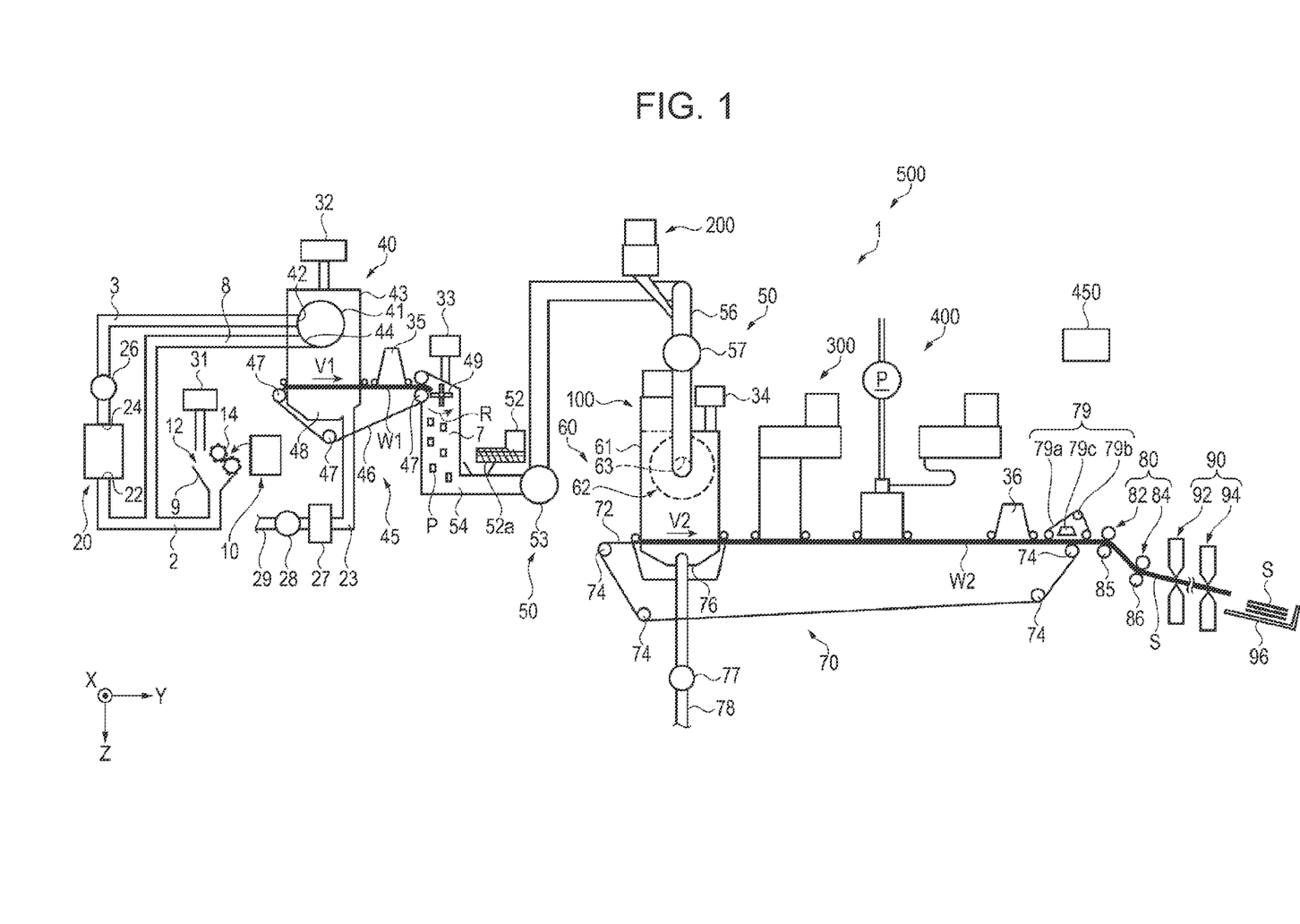
FIG. 1 is a schematic view illustrating the structure of a molded body manufacturing apparatus according to an embodiment of the present disclosure.

As illustrated in FIG. 1, the molded body manufacturing apparatus 500 includes a raw material supplying unit 10, a coarse crushing unit 12, a defibrating unit 20, a screening unit 40, a first web forming unit 45, a rotator 49, a transportation unit 50, a sieve unit 60, a second web forming unit 70, a first supplying unit 100, a second supplying unit 200, a third supplying unit 300, a fourth supplying unit 400, a transferring unit 79, a molded body forming unit 80, a cutting unit 90, and a receiving unit 96.

Among the components of the molded body manufacturing apparatus 500, the raw material supplying unit 10, the coarse crushing unit 12, the defibrating unit 20, the screening unit 40, the first web forming unit 45, the rotator 49, the transportation unit 50, the sieve unit 60, the second web forming unit 70, the first supplying unit 100, the second supplying unit 200, the third supplying unit 300, and the fourth supplying unit 400 constitute a web forming apparatus 1. In other words, the molded body manufacturing apparatus 500 includes the web forming apparatus 1, the transferring unit 79, the molded body forming unit 80, the cutting unit 90, and the receiving unit 96.

The molded body manufacturing apparatus 500 further includes humidifying units 31, 32, 33, 34, 35, and 36 provided for the purpose of, for example, humidifying the raw material, and humidifying the space in which the raw material moves. By humidification, the humidifying units 31, 32, 33, 34, 35, and 36 prevents static cling of the raw material, etc. The humidifying units 31, 32, 33, and 34 are, for example, vaporizing humidifiers or warm-air-vaporization-type humidifiers. The humidifying units 35 and 36 are, for example, ultrasonic humidifiers.

The molded body manufacturing apparatus 500 further includes a control unit 450. The control unit 450 controls the operation of the raw material supplying unit 10, the coarse crushing unit 12, the defibrating unit 20, the screening unit 40, the first web forming unit 45, the rotator 49, the transportation unit 50, the sieve unit 60, the second web forming unit 70, the first supplying unit 100, the second supplying unit 200, the third supplying unit 300, the fourth supplying unit 400, the transferring unit 79, the molded body forming unit 80, the cutting unit 90, the receiving unit 96, and the humidifying units 31, 32, 33, 34, 35, and 36.

The raw material supplying unit 10 supplies a raw material to the coarse crushing unit 12. The raw material supplied to the coarse crushing unit 12 may be any material that contains fibers. Some examples of the raw material include: paper, pulp, pulp sheet, nonwoven fabric, cloth, woven fabric, etc. In the example described below, the molded body manufacturing apparatus 500 is configured to use waste paper as the raw material. For example, the raw material supplying unit 10 includes a stacker, on which sheets of waste paper are loadable in a stacked state, and an automatic material feeder, which feeds the waste paper from the stacker to the coarse crushing unit 12.

The coarse crushing unit 12 shreds the raw material supplied by the raw material supplying unit 10 into coarse-crushed pieces by means of its coarse crushing blades 14. The coarse crushing blades 14 shred the raw material under atmospheric conditions such as in air. For example, the coarse crushing unit 12 includes a pair of coarse crushing blades 14 configured to shred the raw material, with the raw material nipped therebetween, and a driving unit configured to cause the coarse crushing blades 14 to rotate. The structure of the coarse crushing unit 12 may be similar to the structure of a so-called shredder. The shape and size of a coarse-crushed piece may be any shape and size. It is sufficient as long as the shape and size of a coarse-crushed piece are suitable for defibration to be performed by the defibrating unit 20. The coarse crushing unit 12 shreds the raw material into pieces each having a shredded size of, for example, one to a few square centimeters, or smaller. The coarse-crushed pieces produced by shredding by the coarse crushing unit 12 go through a pipe 2 via a chute 9 and are then transported to the defibrating unit 20.

The defibrating unit 20 defibrates the coarse-crushed pieces produced by shredding by the coarse crushing unit 12. More specifically, the defibrating unit 20 performs defibrating processing on the raw material having undergone shredding by the coarse crushing unit 12, thereby producing a defibrated material. The term "defibrate" as used herein means the act/operation of disentangling a raw material made up of fibers bound to one another into individual unbound pieces. The defibrating unit 20 has a function of separating, from the fibers, resin particles adhering to the raw material, and other substances adhering thereto such as ink, toner, and blurring inhibitor, etc.

The output from the defibrating unit 20 is called as defibrated material. The defibrated material sometimes contains, in addition to defibrated fibers, particles of resin separated from the fibers during the process of defibration, that is, particles of binder resin for bonding the fibers to one another, a colorant such an ink, toner, etc., an additive such as blurring inhibitor, paper-stiffening agent, etc. The defibrated material has a string shape or a ribbon shape. The defibrated material may be in a free state such that a defibrated fiber is not intertwined with other defibrated fibers, that is, in an independent state. Alternatively, the defibrated material may be in a state of so-called "lump", meaning a state of intertwinement with one another.

The defibrating unit 20 performs dry defibration. The term "dry" as used herein means a method in which processing such as defibration is performed under atmospheric conditions, for example, in air, not in a liquid. The defibrating unit 20 is configured using, for example, an impeller mill. Specifically, the defibrating unit 20 includes a rotor that rotates at a high speed and a liner that is located at the outer circumference of the rotor, though not illustrated. The coarse-crushed pieces produced by shredding by the coarse crushing unit 12 go between the rotor and the liner and are defibrated thereat.

The defibrating unit 20 produces an airflow by rotation of the rotor. By utilizing this airflow, the defibrating unit 20 is able to suck into itself the coarse-crushed pieces, the raw material after the shredding, from the pipe 2 through an inlet 22, and send the defibrated material to an outlet 24. The defibrated material is sent out to a pipe 3 from the outlet 24 and is then sent to the screening unit 40 through the pipe 3. In the illustrated example, the molded body manufacturing apparatus 500 is equipped with a defibrating blower 26, which is an airflow generator, and the defibrated material is sent to the screening unit 40 by the airflow generated by the defibrating blower 26.

The screening unit 40 has an inlet 42 through which the defibrated material having undergone defibration by the defibrating unit 20 enters from the pipe 3 together with the airflow. Based on fiber lengths, the screening unit 40 screens the defibrated material having entered through the inlet 42. More particularly, the screening unit 40 screens the defibrated material having undergone defibration by the defibrating unit 20 into a first screened material, which is the defibrated material not larger than predetermined size, and a second screened material, which is larger than the first screened material. The first screened material contains fibers or particles, etc. The second screened material contains, for example, large fibers, yet-to-be-defibrated pieces, coarse-crushed pieces not having been defibrated sufficiently, gatherings of defibrated fibers, or lumps formed by entanglement, etc. The screening unit 40 has, for example, a drum portion 41 and a housing portion 43. The drum portion 41 is housed in the housing portion 43.

The drum portion 41 is a cylindrical sieve that is driven to rotate by a motor. The drum portion 41 has a net and behaves as a sieve. Through the meshes of the net, the drum portion 41 sorts the defibrated material into the first screened material, namely, those smaller than the meshes of the net, and the second screened material, namely, those larger than the meshes of the net.

The defibrated material having entered through the inlet 42 is sent into the drum portion 41 together with the airflow. Due to the rotation of the drum portion 41, the first screened material falls through the meshes of the net of the drum portion 41. The second screened material, which is too large to pass through the meshes of the net of the drum portion 41, is driven toward an outlet 44 by the airflow entering the drum portion 41 through the inlet 42, and is then sent out to a pipe 8. The pipe 8 connects the inside of the drum portion 41 to the pipe 2. The second screened material flowing through the pipe 8 is returned to the defibrating unit 20 and undergoes defibration processing thereat.

The first screened material screened by the drum portion 41 passes through the meshes of the net of the drum portion 41, is dispersed in air, and drops toward a mesh belt 46 of the first web forming unit 45, which is located under the drum portion 41.

The first web forming unit 45 includes the mesh belt 46, rollers 47, and a suction unit 48. The mesh belt 46 is an endless belt. The mesh belt 46 is stretched around three rollers 47. Driven by the rollers 47, the mesh belt 46 travels in the direction indicated by the arrow in the figure. The surface of the mesh belt 46 has a net structure with arrays of openings of predetermined size. Among those constituting the first screened material dropping from the screening unit 40, fine particles that are small enough to pass through the meshes of the net fall down through the mesh belt 46, whereas fibers that are not small enough to pass through the meshes of the net settle and accumulate on the mesh belt 46 to form into a first web W1. The first web W1 formed on the mesh belt 46 is transported in the direction indicated by the arrow, together with the mesh belt 46. The fine particles dropping from the mesh belt 46 include those of relatively small size and low density in the defibrated material such as resin particles not needed for binding between fibers and fibers, colorants, additives, etc. Such fine particles are to-be-removed particles that are not used for manufacturing sheets S by the molded body manufacturing apparatus 500.

The mesh belt 46 moves at a constant velocity V1 during normal operation for manufacturing the sheets S. The phrase "during normal operation" as used herein means "during the execution of operation excluding start control and stop control of the molded body manufacturing apparatus 500." More particularly, it means a time while the molded body manufacturing apparatus 500 manufactures sheets S of desired quality.

The suction unit 48 sucks air from below the mesh belt 46. The suction unit 48 is connected to a dust collection unit 27 via a pipe 23. The dust collection unit 27 is a filter-type or cyclone-type dust collector. The dust collection unit 27 separates fine particles from the airflow. A trapping blower 28 is provided downstream of the dust collection unit 27. The trapping blower 28 serves as a dust-collecting suction mechanism configured to suck air from the dust collection unit 27. Air discharged from the trapping blower 28 goes out of the molded body manufacturing apparatus 500 through a pipe 29.

The humidifying unit 35 supplies air containing a mist downstream of the screening unit 40 on the traveling path of the mesh belt 46. The mist, fine particles of water, generated by the humidifying unit 35 falls onto the first web W1 and supplies moisture to the first web W1. The supplying of such misty air adjusts the amount of moisture contained in the first web W1. The moisture adjustment makes it possible to prevent the static cling of fibers, etc. to the mesh belt 46.

The molded body manufacturing apparatus 500 includes the rotator 49 configured to break, into fragments, the first web W1 formed by accumulation on the mesh belt 46. The first web W1 comes off from the mesh belt 46 at a position where the mesh belt 46 is turned back by the roller 47. Then, the first web W1 is broken into fragments by the rotator 49.

The rotator 49 has thin blades and has a rotary-impeller shape. The rotator 49 is disposed at a position where the first web W1 coming off from the mesh belt 46 comes into contact with its blades. Due to the rotation of the rotator 49, for example, rotation in the direction indicated by the arrow R in the figure, the first web W1 coming off from the mesh belt 46 and being transported collides with the blades, thereby being cut into pieces. Fragments P are produced in this way. The fragments P are an example of a principal material for forming a second web W2, which will be described later, and forming a sheet S. The fragments P produced by fragmentation by the rotator 49 fall down inside a pipe 7, and are then sent to the transportation unit 50 by the flow of air inside the pipe 7.

Figure 2:
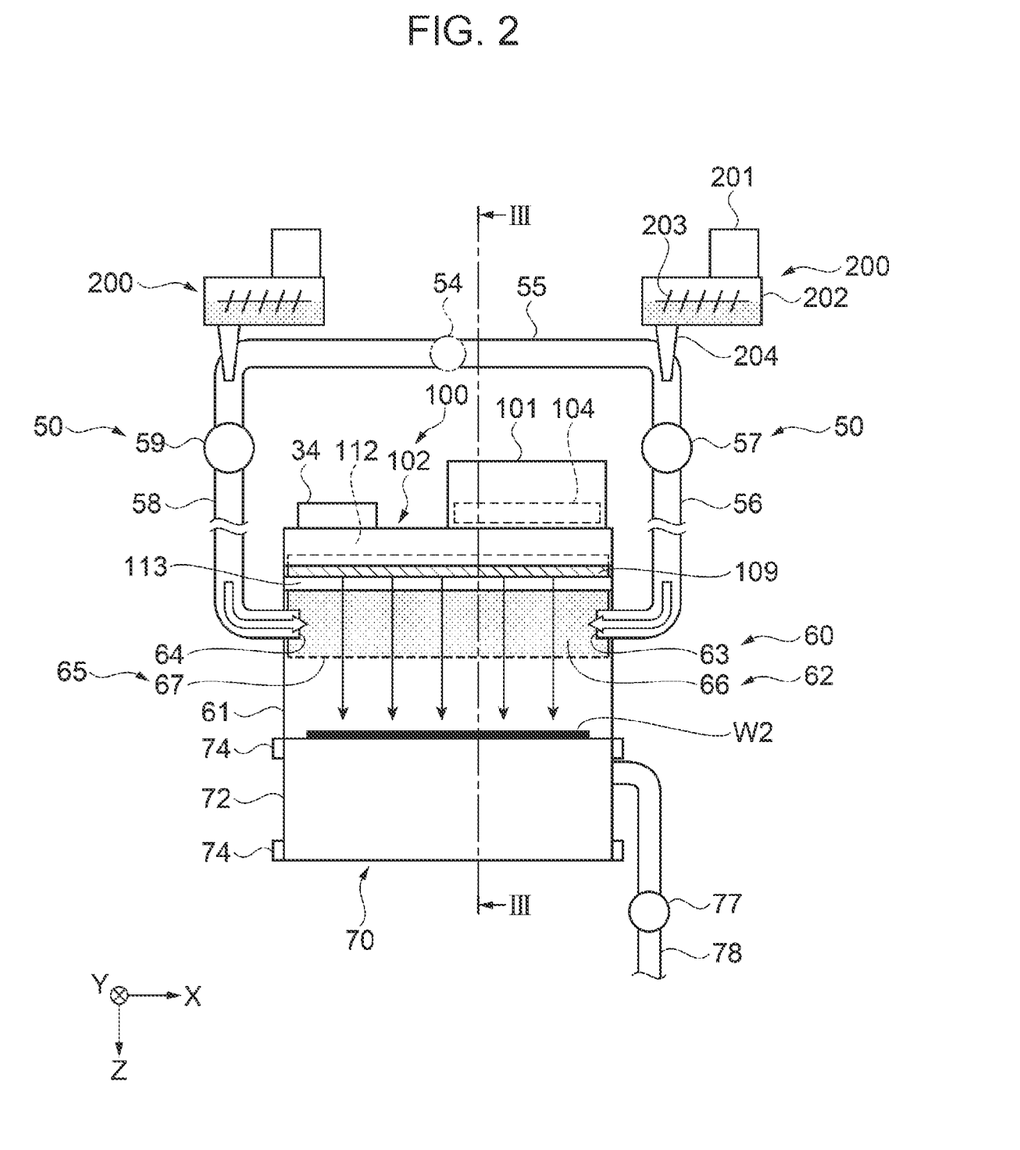
FIG. 2 is a side view illustrating the structure of a sieve unit and its neighborhood.

The transportation unit 50 includes an additive supplying unit 52, which supplies an additive that contains resin, a transportation pipe 54, which is in communication with the pipe 7 and through which an airflow containing the fragments P flows, and a mixing blower 53, which is provided on the transportation pipe 54. The transportation pipe 54 is an example of a transportation passage. As illustrated in FIGS. 1 and 2, the transportation unit 50 includes a transportation pipe 55, which is in communication with the downstream side of the transportation pipe 54 in the transportation direction and extends in the X-axis direction, a transportation pipe 56, which is in communication with the +X-directional side of the transportation pipe 55 and extends in the +Z direction, the second supplying unit 200 provided on the transportation pipe 56, and a blower 57, which is provided on the transportation pipe 56 on the +Z-directional side downstream of the second supplying unit 200. The transportation unit 50 further includes a transportation pipe 58, which is in communication with the −X-directional side of the transportation pipe 55 and extends in the +Z direction, the second supplying unit 200 provided on the transportation pipe 58, and a blower 59, which is provided on the transportation pipe 58 on the +Z-directional side downstream of the second supplying unit 200. The transportation pipe 55, 56, 58 is an example of a transportation passage. In FIG. 2, a part of the transportation pipe 56, 58 and the inside of a housing 61 of the sieve unit 60 are shown in cross section.

The transportation unit 50 performs transportation toward the sieve unit 60 while causing the mixing blower 53 to generate an airflow and mixing the fragments P with the additive that contains the resin inside the transportation pipe 54.

A non-illustrated additive cartridge that contains the additive is connected to the additive supplying unit 52. The additive supplying unit 52 supplies the additive contained in the additive cartridge to the transportation pipe 54. The additive supplying unit 52 temporarily stores the additive to be fed from the additive cartridge. The additive supplying unit 52 has an outlet portion 52a, via which the additive stored temporarily is sent to the transportation pipe 54.

The additive which the additive supplying unit 52 supplies contains resin for serving as a binder for bonding the fibers to one another. The resin contained in the additive is thermoplastic resin or thermosetting resin. Some examples of this resin include: AS resin, ABS resin, polypropylene, polyethylene, polyvinyl chloride, polystyrene, acrylic resin, polyester resin, polyethylene terephthalate, polyphenylene ether, polybutylene terephthalate, polyamide, polycarbonate, polyacetal, polyphenylene sulfide, polyetherether ketone, and the like. Any of these kinds of resin may be used alone, or a mixture of any of them may be used. That is, the additive may contain a single substance alone or may be a mixture. The additive may contain plural kinds of particles each consisting of either a single substance alone or plural substances. The additive may be fibrous or powdery.

The resin contained in the additive, when heated, melts to cause the binding of fibers together. Therefore, in a state in which the resin is mixed with fibers but not heated to its melting temperature, the binding of the fibers together will not occur.

Due to the airflow generated by the mixing blower 53, the fragments P falling inside the pipe 7, and the additive, are sucked into the transportation pipe 54, and flow through the inside of the mixing blower 53 and through the transportation pipe 55 toward the sieve unit 60. Due to the airflow generated by the mixing blower 53, and by the action of the rotating portion such as blades of the mixing blower 53, the fragments P and the additive become mixed. The mixture of the fragments P and the additive, together with powder supplied from the second supplying unit 200 into the transportation pipe 56, 58 when needed, flows through the transportation pipe 56, 58 toward an accommodating chamber 66 of a drum portion 62 of the sieve unit 60, which will be described later.

Figure 3:
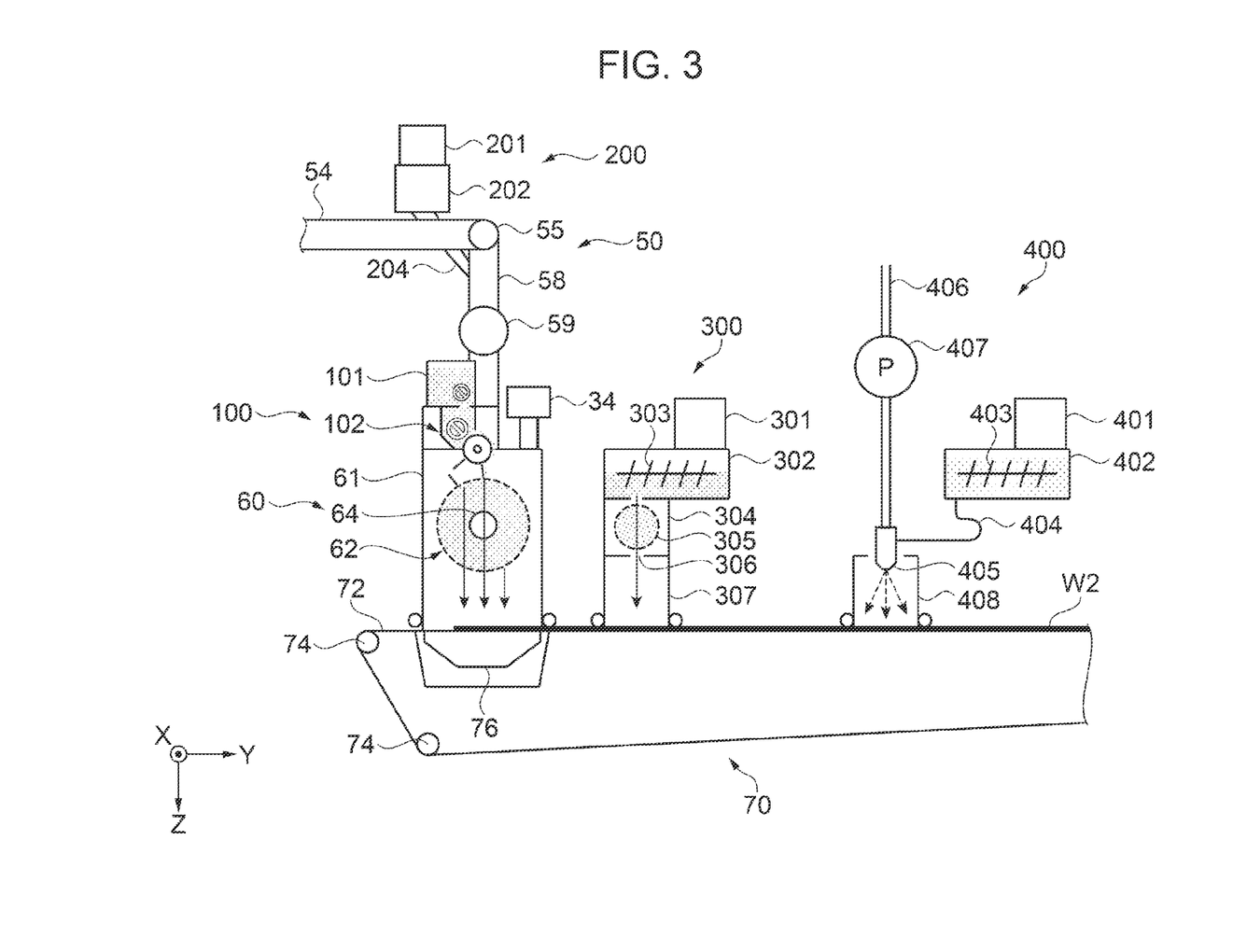
FIG. 3 is a schematic cross-sectional view illustrating the structure of the sieve unit and a first supplying unit illustrated in FIG. 2, taken along the line III-III thereof, and the structure of a second supplying unit illustrated therein, a third supplying unit, and a fourth supplying unit.

As illustrated in FIGS. 2 and 3, in the present embodiment, two second supplying units 200 are provided so as to be able to supply powder into the transportation pipes 56 and 58. The powder supplied by the second supplying unit 200 contains a powdery functional material. The functional material will be described later. The second supplying unit 200 includes a container 201, a storing chamber 202, and a connection pipe passage 204.

The container 201, in which the powder is contained, is mounted on the −Z-directional side on the storing chamber 202. The storing chamber 202 temporarily stores the powder to be fed from the container 201. A feeding mechanism 203 is provided in the storing chamber 202. The second supplying unit 200 supplies the powder into the transportation pipe 56, 58 through the connection pipe passage 204 while stirring the powder inside the storing chamber 202.

The connection pipe passage 204 is provided on the +Z-directional side on the storing chamber 202. The connection pipe passage 204 provides connection between the storing chamber 202 and a +Z-directional-side position in the transportation pipe 56, 58 with respect to the storing chamber 202. The transportation pipes 56 and 58, on which the two second supplying units 200 are provided, extend in the +Z direction toward the sieve unit 60. Because of this configuration, the powder supplied into the transportation pipe 56, 58 from the second supplying unit 200 falls easily inside the transportation pipe 56, 58. Therefore, the suction power of the blower 57, 59 may be weaker than the suction power of the mixing blower 53. Moreover, because of this configuration, for example, as compared with a configuration in which the transportation pipe 56, 58 on which the second supplying unit 200 is provided extends in the X-axis direction, it is possible to reduce the alteration of the powder due to the contact of the powder with the inner surface of the transportation pipe 56, 58 and reduce damage to the inner surface of the transportation pipe 56, 58.

Figure 4:
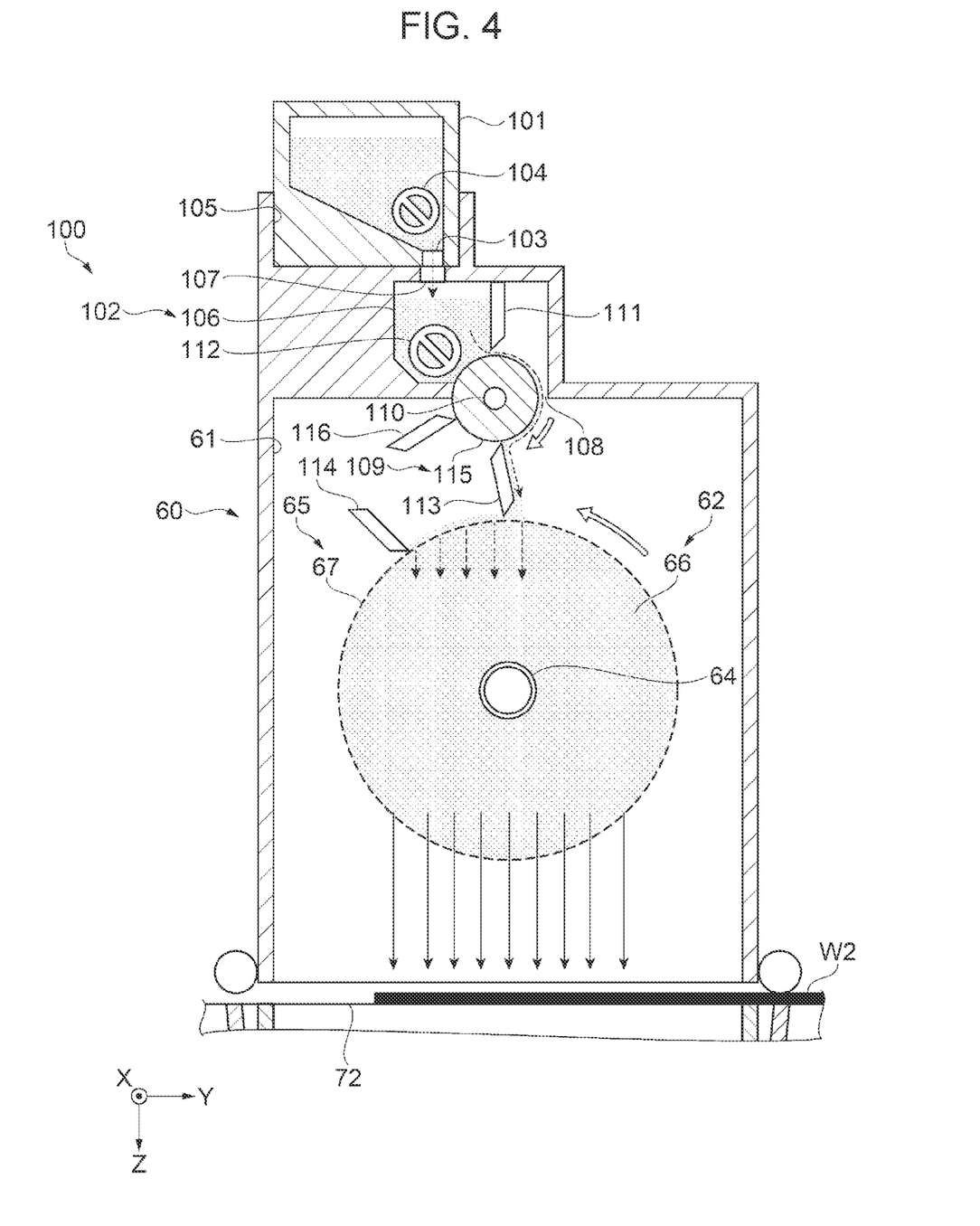
FIG. 4 is a key-part cross-sectional view illustrating the structure of the first supplying unit and the sieve unit.

As illustrated in FIGS. 2, 3, and 4, the sieve unit 60 has a drum portion 62 and a housing 61. The drum portion 62 is housed in the housing 61. The drum portion 62 has a cylindrical accommodating chamber 66. The accommodating chamber 66 is able to accommodate the fragments P and the additive entering through an inlet 63, which is in communication with the transportation pipe 56, and through an inlet 64, which is in communication with the transportation pipe 58, and the powder supplied from the second supplying units 200 and entering through them. In addition, the accommodating chamber 66 is able to accommodate powder supplied from the first supplying unit 100, which will be described later. The drum portion 62 is a cylindrical sieve that is driven to rotate by a motor. The drum portion 62 is held in the housing 61 such that the central axis of its cylindrical body is oriented along the X axis. The drum portion 62 is held in the housing 61 such that it is able to rotate around the central axis of its cylindrical body. In this case, the drum portion 62 may be held rotatably by the inlets 63 and 64 provided in the housing 61.

The drum portion 62 has a net 65 and serves as a sieve. The net 65 is an example of a peripheral surface demarcating the accommodating chamber 66. The net 65 of the drum portion 62 has meshes 67. Fibers and particles that are smaller than the meshes 67 of the net 65 are allowed to pass and fall in the +Z direction from the drum portion 62. The mesh 67 is an example of a through hole. The structure of the drum portion 62 is, for example, the same as the structure of the drum portion 41. Some examples of the net 65 of the drum portion 62 include: a wire net, an expanded metal net formed by pulling and expanding a metal plate having slits, and a punched metal net formed by punching through-holes through a metal plate by using a punching press machine, etc.

When the mixture of the fragments P and the additive having flowed through the transportation unit 50 and the powder supplied from the second supplying units 200 enter the accommodating chamber 66 via the inlets 63 and 64 as indicated by the empty arrows in FIG. 2, the sieve unit 60 disentangles the entangled mixture and lets the disentangled mixture fall while dispersing it in air. Moreover, if the resin of the additive supplied from the additive supplying unit 52 is fibrous, the sieve unit 60 disentangles the entangled fibers of the resin. In addition, the powder supplied from an outlet portion 108 of the first supplying unit 100, which will be described later, enters the accommodating chamber 66 of the sieve unit 60 through the meshes 67 of the net 65. Therefore, the sieve unit 60 is able to sift the mixture of the fragments P, the additive, the powder supplied from the second supplying units 200, and the powder supplied from the first supplying unit 100 onto a mesh belt 72 of the second web forming unit 70 and let it accumulate thereon uniformly.

The first supplying unit 100 is able to supply the powder to the accommodating chamber 66 of the drum portion 62. The first supplying unit 100 is an example of a supplying unit. The powder supplied by the first supplying unit 100 contains a powdery functional material. The powder supplied by the first supplying unit 100 may be the same as the powder supplied by the second supplying units 200. The powder supplied by the first supplying unit 100 may be different from the powder supplied by the second supplying units 200. The functional material will be described later.

As illustrated in FIGS. 2, 3, and 4, the first supplying unit 100 includes a container 101 and a supply mechanism 102. The supply mechanism 102 includes a container holder 105, a storing chamber 106, an outlet portion 108, a roller 109, a doctor blade 111, a scraping blade 113, a cleaning blade 116, and a putting-in blade 114. The container holder 105 holds the container 101.

The container 101 contains the powder that is to be supplied by the first supplying unit 100 to the drum portion 62 of the sieve unit 60. In a state in which the container 101 is held by the container holder 105, the powder contained in the container 101 is located at the −Z-directional side above the storing chamber 106. An outlet 103, via which the contained powder goes out, is formed in the +Z-directional-side surface, namely, the bottom surface, of the container 101 in a state in which the container 101 is held by the container holder 105. The container 101 is equipped with a stirring mechanism 104, which is able to stir the powder contained therein.

The storing chamber 106 is provided on the +Z-directional side below the container holder 105. The storing chamber 106 temporarily stores the powder having gone out of the container 101 via the outlet 103 as indicated by the broken-line arrow in FIG. 4. An inlet 107, via which the powder having gone out via the outlet 103 enters the storing chamber 106, is formed in the upper surface, which is the −Z-directional-side surface demarcating the storing chamber 106. The storing chamber 106 is equipped with a stirring mechanism 112, which is able to stir the powder stored temporarily therein.

An outlet portion 108, via which the powder stored temporarily in the storing chamber 106 is allowed to go out downward in the +Z direction, is formed in the lower surface, which is the +Z-directional-side surface demarcating the storing chamber 106. The outlet portion 108 according to the present embodiment is made up of a through hole formed in the lower surface of the storing chamber 106, and the roller 109. The through hole of the outlet portion 108 provides communication between the storing chamber 106 and the housing 61. The through hole of the outlet portion 108 is provided for the storing chamber 106 vertically over the net 65 of the drum portion 62 on the −Z-directional side. It is preferable if the opening size of the through hole of the outlet portion 108 in the X-axis direction is set be equal to or greater than the size of the second web W2 in the X-axis direction.

The roller 109 of the outlet portion 108 is a cylindrical roller that is driven to rotate by a motor. The roller 109 is provided such that its rotation shaft 110 is oriented along the X axis. The roller 109 has an outer circumferential surface 115. It is preferable if the size of the outer circumferential surface 115 in the X-axis direction is set be equal to or greater than the size of the second web W2 in the X-axis direction. In the Y-axis direction, the roller 109 is provided at a position that is relatively on the −Y-directional side with respect to the center of the through hole of the outlet portion 108. Therefore, the outlet portion 108 has a clearance at the +Y-directional side of the outer circumferential surface 115 of the roller 109. The size of this clearance in the X-axis direction is the same as the size of the through hole of the outlet portion 108 in the X-axis direction.

The roller 109 is provided at a location where the outer circumferential surface 115 moves between a position of being in contact with the powder stored in the storing chamber 106 and a position that is between the through hole of the outlet portion 108 and the net 65 of the drum portion 62 in the Z-axis direction, by rotating in the direction indicated by the empty arrow in FIG. 4. Therefore, by rotating in the direction indicated by the empty arrow in FIG. 4 around the rotation shaft 110, the roller 109 is able to cause the powder clinging to the outer circumferential surface 115 in the storing chamber 106 to move toward the net 65 of the drum portion 62 via the above-mentioned clearance formed at the +Y-directional side of the outer circumferential surface 115.

The doctor blade 111 is provided inside the storing chamber 106. The scraping blade 113, the cleaning blade 116, and the putting-in blade 114 are provided inside the housing 61. The scraping blade 113 is provided between the roller 109 and the net 65 of the drum portion 62 in the Z-axis direction.

The scraping blade 113 is provided on the −Z-directional side vertically over the net 65 of the drum portion 62. The scraping blade 113 scrapes the powder off from the outer circumferential surface 115. It is preferable if the size of the scraping blade 113 in the X-axis direction is set be equal to or greater than the size of the outer circumferential surface 115 of the roller 109 in the X-axis direction.

As viewed in the direction in which the roller 109 rotates, the cleaning blade 116 is provided behind the scraping blade 113. By being in contact with the outer circumferential surface 115 of the roller 109, the cleaning blade 116 cleans the outer circumferential surface 115. It is preferable if the size of the cleaning blade 116 in the X-axis direction is set be equal to or greater than the size of the outer circumferential surface 115 of the roller 109 in the X-axis direction.

In the Z-axis direction, the putting-in blade 114 is provided on the −Z-directional side above the center of rotation of the drum portion 62. As viewed in the rotating direction of the drum portion 62 indicated by the empty arrow in FIG. 4, the putting-in blade 114 is provided behind the scraping blade 113. By being in contact with the net 65 of the drum portion 62, the putting-in blade 114 puts the powder clinging to the net 65 into the accommodating chamber 66 through the meshes 67. It is preferable if the size of the putting-in blade 114 in the X-axis direction is set be equal to or greater than the size of the net 65 of the drum portion 62 in the X-axis direction.

The doctor blade 111 is provided such that the gap between its contact edge, namely, +Z-directional-side end, and the outer circumferential surface 115 of the roller 109 is a predetermined gap value. Therefore, the doctor blade 111 restricts the amount of the powder clinging to the outer circumferential surface 115 of the roller 109 that is rotating, by contact with an extra portion of the powder clinging to the outer circumferential surface 115 more than necessary. The amount of the powder clinging to the outer circumferential surface 115 can be adjusted by changing the position of the contact edge of the doctor blade 111. Therefore, the position of the contact edge of the doctor blade 111 may be configured to be adjustable with respect to the outer circumferential surface 115 of the roller 109.

The powder clinging to the outer circumferential surface 115 of the roller 109, after the adjustment of its amount of clinging to the outer circumferential surface 115 by the doctor blade 111, passes through the clearance mentioned above due to the rotation of the roller 109. Then, the powder clinging to the outer circumferential surface 115 of the roller 109 either falls vertically downward in the +Z direction due to gravity acting on the powder or is scraped off from the outer circumferential surface 115 by the scraping blade 113 provided on the +Z-directional side with respect to the roller 109, thereby falling toward the net 65 of the drum portion 62.

The powder having fallen toward the net 65 of the drum portion 62 either passes through the meshes 67 of the net 65 and then enters the accommodating chamber 66 as indicated by the broken-line arrows in FIG. 4 or clings to the net 65 of the drum portion 62. Due to the rotation of the drum portion 62 in the direction indicated by the empty arrow in FIG. 4, the powder clinging to the net 65 of the drum portion 62 comes into contact with the putting-in blade 114 and is then put into the accommodating chamber 66 through the meshes 67 as indicated by the broken-line arrows in FIG. 4.

In other words, the first supplying unit 100 supplies the powder stored in the storing chamber 106 to the accommodating chamber 66 through the meshes 67 of the net 65 of the drum portion 62 by letting the powder fall from the outlet portion 108. Unlike a configuration of transporting the powder to the accommodating chamber 66 via the transportation unit 50, this configuration makes it possible to supply the powder to the accommodating chamber 66 by letting the powder fall; therefore, it is possible to reduce damage to the inner surface of the transportation pipe 54, 55, 56, 58. Since the powder is transported by the airflow generated by the blower 57, 59 inside the transportation pipe 56, 58, friction is prone to occur due to the contact of powder particles with one another. In this respect, since the first supplying unit 100 supplies the powder to the accommodating chamber 66 by letting the powder fall, friction between powder particles is not prone to occur; therefore, it is possible to suppress the alteration of the powder supplied to the accommodating chamber 66.

Moreover, as compared with a configuration of supplying the powder stored in the storing chamber 106 to the accommodating chamber 66 not through the net 65 of the drum portion 62, the first supplying unit 100 of this configuration makes it easier to reduce the powder falling inside the accommodating chamber 66 and reaching the inside of the net 65 without any contact with the net 65 of the drum portion 62 after falling from the outlet portion 108. Therefore, it is possible to reduce damage to the inner surface of the accommodating chamber 66 resulting from the contact of the powder supplied from the first supplying unit 100 with the inner surface of the accommodating chamber 66.

The powder having been supplied to the accommodating chamber 66 through the meshes 67 of the net 65 of the drum portion 62 passes through the meshes 67 of the net 65 again to fall toward the mesh belt 72, which is located at the +Z-directional side, as indicated by the solid-line arrow. In other words, the first supplying unit 100 is able to sift the powder stored in the storing chamber 106 such that the powder passes through the meshes 67 of the net 65 of the drum portion 62 twice by letting the powder fall from the outlet portion 108. The outer circumferential surface 115 having passed through the scraping blade 113 is cleaned by the cleaning blade 116.

As illustrated in FIGS. 1, 2, and 3, the second web forming unit 70 is disposed at the +Z-directional side below the drum portion 62. The second web forming unit 70 is an example of a web forming unit. The second web forming unit 70 forms the second web W2 by letting the mixture having passed through the sieve unit 60, namely, the mixture of the fragments P, the additive, the powder supplied from the second supplying units 200, and the powder supplied from the first supplying unit 100, accumulate on the mesh belt 72. The second web W2 is an example of a web. Therefore, it is preferable if the size of the net 65 of the drum portion 62 in the X-axis direction is set be equal to or greater than the size of the second web W2 in the X-axis direction. The second web forming unit 70 includes the mesh belt 72, rollers 74, and a suction mechanism 76.

The mesh belt 72 is an endless belt. The mesh belt 72 is stretched around a plurality of rollers 74. Driven by the rollers 47, the mesh belt 72 travels in the direction indicated by the solid-line arrow in FIG. 1. The mesh belt 72 is made of, for example, metal, resin, cloth, or nonwoven fabric, etc. The surface of the mesh belt 72 has a net structure with arrays of openings of predetermined size.

As indicated by the solid-line allows in FIGS. 2, 3, and 4, the above-described mixture of the fragments P, the additive, the powder supplied from the second supplying units 200, and the powder supplied from the first supplying unit 100 falls from the drum portion 62, and among the ingredients of this mixture, fine particles that are small enough to pass through the meshes of the net fall toward the +Z-directional side, which is under the mesh belt 72, whereas non-fine ingredients that are not small enough to pass through the meshes of the net accumulate on the mesh belt 72 and are then transported in the direction indicated by the solid-line arrow in FIG. 1 together with the mesh belt 72. The mesh belt 72 moves at a constant velocity V2 during normal operation for manufacturing the sheets S.

Since the meshes of the net of the mesh belt 72 are fine, it is possible to ensure that most of the ingredients of the above-described mixture falling from the drum portion 62 will not pass.

As illustrated in FIG. 1, the suction mechanism 76 is provided on the +Z-directional side below the mesh belt 72. The suction mechanism 76 includes a suction blower 77 provided on a suction flow passage 78. It is possible to generate a downward airflow in the +Z direction in the suction mechanism 76 due to a suction force applied by the suction blower 77.

The suction mechanism 76 sucks the mixture dispersed in air by the sieve unit 60 onto the mesh belt 72. This facilitates the forming of the second web W2 on the mesh belt 72 and increases the speed of exiting from the sieve unit 60. Moreover, it is possible to form a downward flow, by the suction mechanism 76, in the path of fall of the mixture; therefore, it is possible to prevent the fragments P and the fibrous additive from becoming entangled while they fall.

Through the above-described processes at the sieve unit 60 and the second web forming unit 70, the second web W2 that contains a lot of air and is therefore soft and slightly bulky is formed. The second web W2 formed by accumulation on the mesh belt 72 is transported toward the molded body forming unit 80.

As illustrated in FIGS. 1 and 3, on the traveling path of the mesh belt 72, the third supplying unit 300 is provided downstream of the sieve unit 60 on the +Y-directional side in the transportation direction. The third supplying unit 300 includes a container 301, a storing chamber 302, a sieve chamber 304, and a supplying chamber 307. The third supplying unit 300 supplies powder onto the −Z-directional-side surface of the second web W2.

The powder supplied by the third supplying unit 300 contains a powdery functional material. The powder supplied by the third supplying unit 300 may be the same as either one of the powder supplied by the first supplying unit 100 and the powder supplied by the second supplying units 200, or may be different therefrom. The powder supplied by the first supplying unit 100, the powder supplied by the second supplying units 200, and the powder supplied by the third supplying unit 300 may be different from one another. The functional material will be described later.

The container 301, in which the powder is contained, is mounted on the −Z-directional side on the storing chamber 302. The storing chamber 302 temporarily stores the powder to be fed from the container 301. The storing chamber 302 is provided on the −Z-directional side with respect to the sieve chamber 304. The storing chamber 302 is equipped with a stirring mechanism 303. The stirring mechanism 303 supplies the powder to a sieve 305, which is provided inside the sieve chamber 304, while stirring the powder inside the storing chamber 302.

The sieve chamber 304 is provided on the −Z-directional side with respect to the supplying chamber 307. The sieve 305 configured to sift the powder supplied from the storing chamber 302 is provided in the sieve chamber 304. The structure of the sieve 305 is the same as the structure of the drum portion 62 of the sieve unit 60. Therefore, the third supplying unit 300 is able to sift the powder stored in the storing chamber 302 such that the powder passes through the meshes of the net of the sieve 305 twice by letting the powder fall from the −Z-directional side, namely, from vertically above the sieve 305. A communication opening 306 for communication between the sieve chamber 304 and the supplying chamber 307 is provided on the +Z-directional side vertically below the sieve 305.

The supplying chamber 307 is provided on the +Z-directional side with respect to the sieve chamber 304. The powder having been supplied to the sieve 305 falls through the communication opening 306 onto the −Z-directional-side surface of the second web W2, which is transported on the +Z-directional side under the communication opening 306, while being sifted by the sieve 305. In other words, the third supplying unit 300 supplies the powder stored in the storing chamber 302 onto the −Z-directional-side surface of the second web W2 by letting the powder fall through the communication opening 306.

On the traveling path of the mesh belt 72, the fourth supplying unit 400 is provided downstream of the third supplying unit 300 on the +Y-directional side in the transportation direction. The fourth supplying unit 400 applies liquid to the second web W2. The fourth supplying unit 400 is an example of a liquid applying unit. The liquid applied by the fourth supplying unit 400 to the second web W2 will be described later. The fourth supplying unit 400 includes a container 401, a storing chamber 402, a nozzle 405, and a supplying chamber 408.

The container 401, in which the liquid is contained, is mounted on the −Z-directional side on the storing chamber 402. The storing chamber 402 temporarily stores the liquid to be fed from the container 401. The storing chamber 402 is equipped with a stirring mechanism 403. The stirring mechanism 403 stirs the liquid inside the storing chamber 402.

The nozzle 405 has an internal mixing chamber that is in communication with nozzle orifices. By utilizing pressurized air supplied into the internal mixing chamber through an air flow passage 406, the nozzle 405 atomizes the liquid stored in the storing chamber 402 connected to the internal mixing chamber through a supplying tube 404 and ejects mixed fluid made up of the atomized liquid and air from the nozzle orifices. The nozzle 405 according to the present embodiment is a so-called two-fluid nozzle having the internal mixing chamber.

A pressuring pump 407 configured to supply pressurized air into the internal mixing chamber is provided on the air flow passage 406. The nozzle 405 has a plurality of nozzle orifices arranged at intervals in the X-axis direction, which is the width direction of the second web W2. With this structure, the fourth supplying unit 400 applies the atomized liquid to the second web W2 throughout the width thereof. The fourth supplying unit 400 may be equipped with a nozzle movement mechanism configured to move the nozzle 405 in the X-axis direction. The fourth supplying unit 400 may include a plurality of nozzle orifices arranged at intervals in the Y-axis direction.

The nozzle orifices of the nozzle 405 are open in the +Z direction inside the supplying chamber 408. By driving the pressuring pump 407, the fourth supplying unit 400 ejects the mixed fluid made up of the atomized liquid and air from the nozzle orifices toward the −Z-directional-side surface of the second web W2 transported in the supplying chamber 408.

As illustrated in FIG. 1, on the traveling path of the mesh belt 72, the humidifying unit 36 is provided downstream of the fourth supplying unit 400 on the +Y-directional side in the transportation direction. The humidifying unit 36 is able to supply air containing a mist to the second web W2. Since the humidifying unit 36 supplies the air containing a mist to the second web W2, the amount of moisture contained in the second web W2 is adjusted. This makes it possible to prevent the static cling of fibers, etc. to the mesh belt 72.

The molded body manufacturing apparatus 500 includes the transferring unit 79 configured to send the second web W2 formed on the mesh belt 72 to the molded body forming unit 80. The transferring unit 79 includes, for example, a mesh belt 79a, rollers 79b, and a suction mechanism 79c.

The suction mechanism 79c includes a non-illustrated suction pump and generates an upward airflow acting on the mesh belt 79a due to a suction force applied by the suction pump. The airflow acts to suck the second web W2. Accordingly, the second web W2 comes off from the mesh belt 72 and is attracted onto the mesh belt 79a. The mesh belt 79a moves due to the rotation of the rollers 79b, thereby sending the second web W2 to the molded body forming unit 80.

As explained above, the second web W2 formed on the mesh belt 72 comes off from the mesh belt 72 and is transported by the transferring unit 79.

The molded body forming unit 80 forms a sheet S from the accumulated material formed on the second web forming unit 70. More specifically, the molded body forming unit 80 applies pressure and heat to the second web W2 formed by accumulation on the mesh belt 72 and transported by the transferring unit 79, thereby forming the second web W2 into a sheet S. At the molded body forming unit 80, by applying heat to the binder for bonding the fibers and the fragments P contained in the second web W2 together, the fibers contained in the mixture are bounded to one another by means of the resin.

The molded body forming unit 80 includes a pressing portion 82, which presses the second web W2, and a heating portion 84, which heats the second web W2 pressed by the pressing portion 82.

The pressing portion 82 is configured as a pair of calendar rollers 85 and applies pressure to the second web W2 while nipping the second web W2 therebetween at a predetermined nip pressure. The pressing reduces the thickness of the second web W2 and increases the density of the second web W2. One of the pair of calendar rollers 85 is a drive roller that is driven by a non-illustrated motor. The other is a driven roller. Receiving the driving power of the motor, the calendar rollers 85 transport, toward the heating portion 84, the second web W2 whose density has increased due to the pressing.

The heating portion 84 is configured using, for example, heating rollers, a heat press shaping machine, hot plates, a hot air blower, an infrared heater, or a flash fixation device, etc. In the illustrated example, the heating portion 84 includes a pair of heating rollers 86. The heating rollers 86 are heated to a preset temperature by a heater provided internally or externally. The heating rollers 86 apply heat to the second web W2 having been pressed by the calendar rollers 85, while nipping the second web W2 therebetween, thereby forming a sheet S.

One of the pair of heating rollers 86 is a drive roller that is driven by a non-illustrated motor. The other is a driven roller. Receiving the driving power of the motor, the heating rollers 86 transport the heated sheet S toward the cutting unit 90.

As described above, the second web W2 formed by the second web forming unit 70 turns into the sheet S by going through the processes of pressing and heating by the molded body forming unit 80. The sheet S is an example of a molded body containing fibers.

The cutting unit 90 cuts the sheet S formed by the molded body forming unit 80. The cutting unit 90 includes a first cutting portion 92, which cuts the sheet S in the direction intersecting with the transportation direction of the sheet S, and a second cutting portion 94, which cuts the sheet S having passed through the first cutting portion 92. The second cutting portion 94 is configured to be able to, for example, cut the sheet S in the direction intersecting with the transportation direction of the sheet S and in the direction parallel to the transportation direction of the sheet S.

The sheet S that has predetermined single-cut size is produced through the above process. The single-cut sheet S is ejected to the receiving unit 96. The receiving unit 96 has a tray or a stacker on which the sheets S of predetermined size are to be stacked.

Next, the functional material contained in the powder supplied by the first supplying unit 100, the second supplying unit 200, and the third supplying unit 300 will now be explained.

The functional material may be a material used for growing plant. Specifically, a fertilizer and a soil conditioner can be used as the functional material. Some examples of the fertilizer include nitrogenous fertilizers such as ammonium sulfate, ammonium chloride, and ammonium nitrate. Particles of a phosphatic fertilizer such as superphosphate, double/triple superphosphate, or fused phosphate may be used. Particles of a potassium fertilizer such as potassium chloride or potassium nitrate may be used. The functional material may be a mixed fertilizer containing a mixture of some of these kinds of fertilizer. The soil conditioner is, for example, a pH adjuster. Specifically, for example, organic lime, vegetable ash, quicklime, hydrated lime, etc. can be used. In this case, by supplying powder that contains the above-described functional material to the accommodating chamber 66 of the drum portion 62 and the second web W2, it is possible to add functionality for plant-growing use to the sheet S.

The functional material may be a material to be used as an insect repellent or an insecticide. Some examples of the insect repellent and the insecticide include natural materials such as camphor tree wood flour and cypress tree wood flour, besides known chemically-synthesized agents such as camphor and naphthalene. These kinds of the insect repellent and the insecticide may be used in a mixed manner. In this case, by supplying powder that contains the above-described functional material to the accommodating chamber 66 of the drum portion 62 and the second web W2, it is possible to add functionality for protection against insects to the sheet S.

The functional material may be a deodorizing material such as a deodorant, an odor adsorbent, or an odor decomposer. Some examples of the odor adsorbent include particles of activated carbon and porous ceramics. As the odor decomposer, for example, titanium oxide may be used.

These kinds of the deodorant and the odor adsorbent may be used in a mixed manner. In this case, by supplying powder that contains the above-described functional material to the accommodating chamber 66 of the drum portion 62 and the second web W2, it is possible to add functionality for use as a deodorizing sheet or an antibacterial sheet to the sheet S.

The functional material may be a moisture-absorbing material. As the moisture-absorbing material, for example, a desiccant such as silica gel may be used. Two or more kinds of the moisture-absorbing material may be used in a mixed manner. In this case, by supplying powder that contains the above-described functional material to the accommodating chamber 66 of the drum portion 62 and the second web W2, it is possible to add functionality for use as a dehumidifying sheet to the sheet S.

The functional material may be a heat-retaining or exothermic/pyrogenic material. Some examples of this kind of a functional material include powder or particles containing capsaicin. Particles of black silica may be mixed as a sub-material into these particles. Two or more kinds of the heat-retaining or exothermic/pyrogenic material may be used in a mixed manner. In this case, by supplying powder that contains the above-described functional material to the accommodating chamber 66 of the drum portion 62 and the second web W2, it is possible to add functionality for use as a heat-retaining or exothermic/pyrogenic sheet to the sheet S.

The functional material may be a moisture-containing material. A certain example of this kind of a functional material is water-absorbing polymer. Two or more kinds of the moisture-containing material may be used in a mixed manner. In this case, by supplying powder that contains the above-described functional material to the accommodating chamber 66 of the drum portion 62 and the second web W2, it is possible to add functionality for use as a moisture-retentive sheet or a moisture-control sheet to the sheet S.

The functional material may be an aromatic material. Some examples of this kind of a functional material include natural materials such as cypress tree wood flour, besides known fragrance materials. Two or more kinds of the aromatic material may be used in a mixed manner. In this case, by supplying powder that contains the above-described functional material to the accommodating chamber 66 of the drum portion 62 and the second web W2, it is possible to add functionality for use as an aromatic sheet to the sheet S.

The functional material may be a material for dustproofing use. Some examples of this kind of a functional material include acrylic resin, urethane resin, and the like. Depending on applications, a conductive agent may be mixed into the resin. In this case, by supplying powder that contains the above-described functional material to the accommodating chamber 66 of the drum portion 62 and the second web W2, it is possible to add functionality for use as a dustproofing sheet to the sheet S.

The functional material may be a material used for imparting water-resistant property. Some examples of this kind of a functional material include paraffin and silicone, etc. In this case, by supplying powder that contains the above-described functional material to the accommodating chamber 66 of the drum portion 62 and the second web W2, it is possible to add functionality for use as a water-resisting sheet to the sheet S.

The functional material may be a material used for imparting oil-resistant property. A certain example of this kind of a functional material is fluorine. In this case, by supplying powder that contains the above-described functional material to the accommodating chamber 66 of the drum portion 62 and the second web W2, it is possible to add functionality for use as an oil-resisting sheet to the sheet S.

The functional material may be a material used for blocking radiation. Some examples of this kind of a functional material include metal powder such as lead powder, titanium powder, tungsten powder, ferrite powder, and amorphous metal powder. In this case, by supplying powder that contains the above-described functional material to the accommodating chamber 66 of the drum portion 62 and the second web W2, it is possible to add functionality for use as a radiation shield sheet or a noise filter to the sheet S.

The functional material may be a material for use as a flame retardant. Some examples of this kind of a functional material include aluminum hydroxide, antimony oxide, boron compound, bromine compound, chlorinated paraffin, non-halogenated phosphate ester, and halogenated phosphate ester, etc. In this case, by supplying powder that contains the above-described functional material to the accommodating chamber 66 of the drum portion 62 and the second web W2, it is possible to add functionality for use as a flame-retardant sheet to the sheet S.

The functional material may be a material for use as an oxygen absorber. A certain example of the oxygen-absorbing material is "AGELESS (registered trademark)", an iron-based deoxidizer manufactured by MITSUBISHI GAS CHEMICAL COMPANY, INC. Activated carbon may be mixed into such an iron-based deoxidizer. In this case, by supplying powder that contains the above-described functional material to the accommodating chamber 66 of the drum portion 62 and the second web W2, it is possible to add functionality for use as an oxygen-absorbing sheet to the sheet S.

The functional material may be plant flour or wood flour. By supplying powder that contains the above-described functional material to the accommodating chamber 66 of the drum portion 62 and the second web W2, it is possible to add, for example, the feel and texture of Japanese traditional handmade paper such as a "shoji" paper screen to the sheet S.

The functional material may be a material for use as an antirust agent. Some examples of the antirust agent include chromate, molybdate, tungstate, nitrite, polymerized phosphate, zinc salt, mercaptobenzothiazole, benzotriazole, alkanolamine, fatty acid salt, alkylamine ethylene oxide adduct, alkyl phosphate ester salt, petroleum sulfonate, sorbitan ester, alkenyl succinic anhydride, alkyl naphthalene sulfonate, diisopropylammonium nitrite, and dicyclohexylammonium nitrite, etc. In this case, by supplying powder that contains the above-described functional material to the accommodating chamber 66 of the drum portion 62 and the second web W2, it is possible to add functionality for use as a rust-resisting sheet to the sheet S.

Next, the liquid applied by the fourth supplying unit 400 to the second web W2 will now be explained.

The liquid applied by the fourth supplying unit 400 to the second web W2 may be water. With this configuration, for example, the following effects can be expected:
moisturizing the functional material contained in the second web W2; improving the efficiency of heating the second web W2 at the molded body forming unit 80; suppressing the scattering, from the second web W2, of the powder supplied from the third supplying unit 300.

The liquid applied by the fourth supplying unit 400 to the second web W2 may be water with an aromatic agent or a deodorant added thereto. With this configuration, it is possible to add functionality for use as an aromatic sheet or a deodorizing sheet to the sheet S.

The liquid applied by the fourth supplying unit 400 to the second web W2 may be water with a liquid glue or a binding agent added thereto. With this configuration, even if the binder supplied by the additive supplying unit 52 is unevenly distributed toward the +Z-directional side in the second web W2, fibers contained in the mixture become bonded to one another well in the process of heating the second web W2 at the molded body forming unit 80.

The liquid applied by the fourth supplying unit 400 to the second web W2 may be water with a dye-based colorant added thereto. With this configuration, it is possible to color the sheet S.

The liquid applied by the fourth supplying unit 400 to the second web W2 may be an emulsion in which particles of urethane resin or acrylic resin are dispersed in water. With this configuration, it is possible to impart quality for use as ink-jet printing paper to the sheet S.

The liquid applied by the fourth supplying unit 400 to the second web W2 may be an emulsion in which particles of fluorine are dispersed in water. With this configuration, it is possible to add functionality for use as an oil-resisting sheet to the sheet S.

The liquid applied by the fourth supplying unit 400 to the second web W2 may be oil. With this configuration, it is possible to add functionality for use as a water-resisting sheet to the sheet S.

The liquid applied by the fourth supplying unit 400 to the second web W2 may be an insect-proofing agent. With this configuration, it is possible to add functionality for protection against insects to the sheet S.

The liquid applied by the fourth supplying unit 400 to the second web W2 may be a mildew-proofing agent. With this configuration, it is possible to add functionality for use as a mildew-proofing sheet to the sheet S.

As described above, the following effects can be obtained from the web forming apparatus 1 and the molded body manufacturing apparatus 500 according to the first embodiment.

The web forming apparatus 1 includes: the first supplying unit 100 that supplies powder; the drum portion 62 that has the accommodating chamber 66 capable of accommodating the fragments P, and accommodating the powder supplied from the first supplying unit 100; and the second web forming unit 70 that forms the second web W2 by letting a mixture containing the fragments P and the powder falling from the drum portion 62 accumulate; wherein the first supplying unit 100 includes the storing chamber 106 for storing the powder and the outlet portion 108 provided below the storing chamber 106, the powder going out of the storing chamber 106 via the outlet portion 108, the drum portion 62 has the meshes 67 formed in the net 65 demarcating the accommodating chamber 66, the powder being able to pass through the meshes 67, and the outlet portion 108 is provided vertically over the net 65 of the drum portion 62, and the first supplying unit 100 supplies the powder to the accommodating chamber 66 through the meshes 67 by letting the powder fall from the outlet portion 108. With this configuration, it is possible to supply the powder held by the first supplying unit 100 to the accommodating chamber 66 of the drum portion 62 through the meshes 67 by letting the powder fall from the outlet portion 108. By this means, as compared with a configuration in which transportation passages are used for transporting the powder, it is possible to reduce damage to the inner surface of the transportation passages and reduce the alteration of the powder. Moreover, by supplying the powder from the first supplying unit 100 to the accommodating chamber 66, it is possible to form the second web W2 having a function added by the powder supplied from the first supplying unit 100.

The web forming apparatus 1 further includes the transportation pipes 56 and 58 through which the fibers are transported to the accommodating chamber 66 of the drum portion 62. With this configuration, it is possible to transport the fibers to the accommodating chamber 66 of the drum portion 62.

The web forming apparatus 1 further includes the second supplying unit 200 provided on the transportation pipe 56, 58 at a position upstream of the drum portion 62 in a direction in which the fibers are transported, the second supplying unit 200 being configured to supply either the powder or powder. With this configuration, it is possible to transport, to the accommodating chamber 66 of the drum portion 62, the powder supplied from the second supplying unit 200. Moreover, by supplying the powder from the second supplying unit 200 to the accommodating chamber 66, it is possible to form the second web W2 having a function added by the powder supplied from the second supplying unit 200.

The web forming apparatus 1 further includes the third supplying unit 300 that supplies either the powder or powder onto a surface of the second web W2. With this configuration, by supplying the powder from the third supplying unit 300 onto the surface of the second web W2, it is possible to form the second web W2 having, on the surface, a function added by the powder supplied from the third supplying unit 300.

The web forming apparatus 1 further includes the fourth supplying unit 400 that applies liquid to the second web W2. With this configuration, by applying the liquid by the fourth supplying unit 400 to the second web W2, it is possible to form the second web W2 having a function added by the liquid supplied from the fourth supplying unit 400. Moreover, it is possible to suppress the scattering of the fibers, the additive, and the powder contained in the second web W2.

The first supplying unit 100 further includes the roller 109 having the outer circumferential surface 115, and the roller 109 causes the powder clinging to the outer circumferential surface 115 to move toward the drum portion 62 by rotating. With this configuration, as compared with a configuration in which transportation passages are used for transporting the powder, it is possible to reduce damage to the inner surface of the transportation passages and reduce the alteration of the powder. Such a damage-reducing and alteration-reducing configuration is desirable for transporting the powder toward the drum portion 62.

The first supplying unit 100 further includes the doctor blade 111 that, by contact with the powder clinging to the outer circumferential surface 115 of the roller 109, restricts the amount of the powder clinging to the outer circumferential surface 115. With this configuration, it is possible to adjust the amount of the powder supplied to the drum portion 62 into an appropriate amount.

The powder may contain metal. If the powder contains metal, for example, it is easier for the powder to fall because of higher specific gravity than powder of resin. Moreover, if the powder contains metal, for example, in most cases the powder has a greater degree of hardness than powder of resin. In this respect, when the first supplying unit 100 and the second supplying unit 200 supply the powder to the accommodating chamber 66 of the drum portion 62 and when the third supplying unit 300 supplies the powder to the second web W2, the powder is moved by utilizing gravity acting on the powder. With this configuration, for example, as compared with a configuration in which the powder containing metal is moved through a transportation passage extending in the horizontal direction, it is possible to reduce the alteration of the powder due to the contact of the powder with the inner surface of the transportation passage and reduce damage to the inner surface of the transportation passage.

The molded body manufacturing apparatus 500 includes the web forming apparatus 1 and the molded body forming unit 80. The molded body forming unit 80 forms a sheet S containing the fibers by applying pressure and heat to the formed second web W2. Since the molded body manufacturing apparatus 500 includes the web forming apparatus 1, with this configuration, by supplying the powder from the first supplying unit 100 to the accommodating chamber 66, it is possible to form the sheet S having a function added by the powder supplied from the first supplying unit 100.

Although the web forming apparatus 1 and the molded body manufacturing apparatus 500 according to the foregoing embodiment of the present disclosure has basically the structure described above, of course, partial changes in structure, omission, etc. can be made within a range of not departing from the gist of the present disclosure. The foregoing embodiment and other embodiments described below may be combined with one another as long as they are not technically contradictory to one another. Other embodiments will now be explained.

In the foregoing embodiment, the coarse crushing unit 12 coarse-crushes the raw material first, and the molded body manufacturing apparatus 500 manufactures sheets S from the coarse-crushed raw material. However, the molded body manufacturing apparatus 500 may be configured to manufacture sheets S by using fibers as the raw material.

For example, the molded body manufacturing apparatus 500 may be configured such that fibers equivalent to the defibrated material having undergone defibration by the defibrating unit 20 can be put into the drum portion 41. The molded body manufacturing apparatus 500 may be configured such that fibers equivalent to the fragments P separated out of the defibrated material, by the defibrating unit 20, can be put into the transportation pipe 54. In this case, it is possible to manufacture sheets S by supplying fibers obtained by processing waste paper or pulp, etc. to the molded body manufacturing apparatus 500.

In the foregoing embodiment, the molded body manufacturing apparatus 500 does not necessarily have to be equipped with the receiving unit 96 configured to receive single-cut sheets S. For example, the molded body manufacturing apparatus 500 may be configured to form a long sheet S into a roll.

Figure 5:
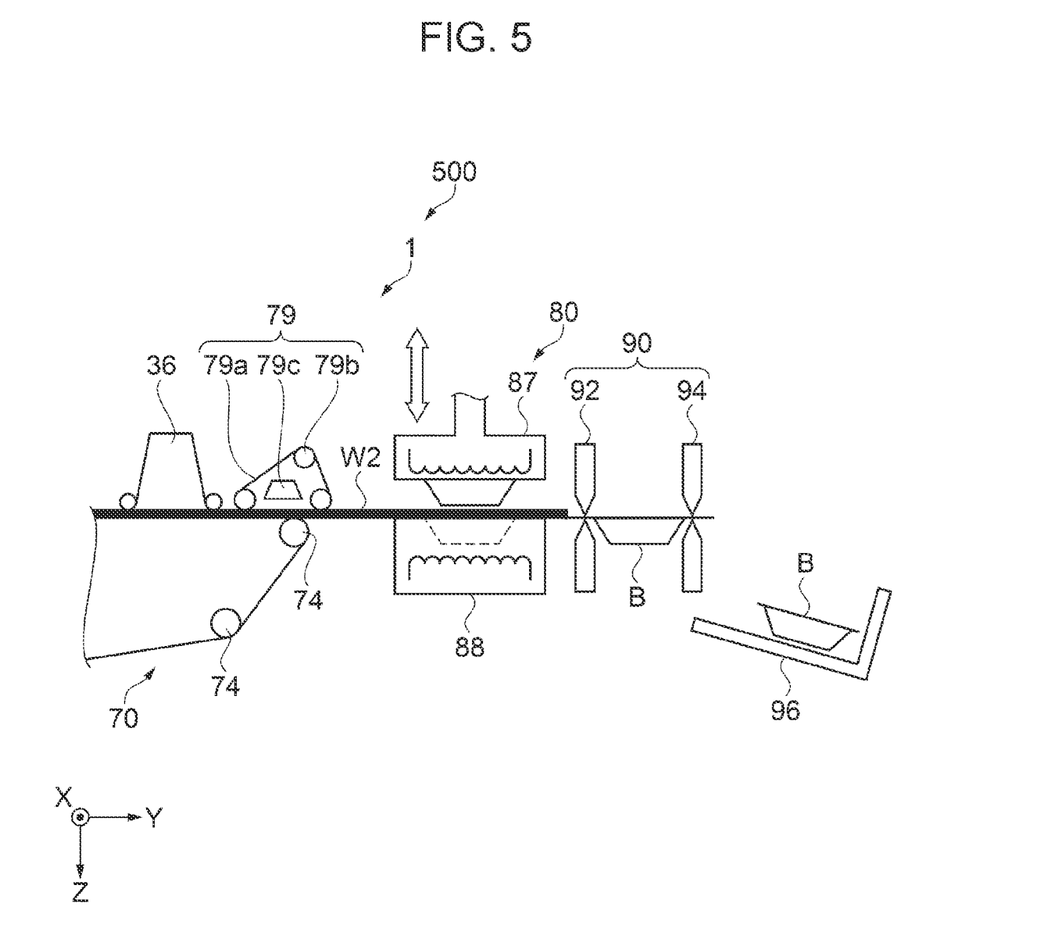
FIG. 5 is a partial schematic view of a molded body manufacturing apparatus according to another embodiment.

In the foregoing embodiment, the molded body forming unit 80 of the molded body manufacturing apparatus 500 includes the pressing portion 82, the heating portion 84, the calendar rollers 85, and the heating rollers 86. However, as illustrated in FIG. 5, the molded body forming unit 80 of the molded body manufacturing apparatus 500 may include a pushing portion 87 and a base portion 88, in place of the pressing portion 82, the heating portion 84, the calendar rollers 85, and the heating rollers 86. As indicated by the empty arrow in FIG. 5, the pushing portion 87 is able to be lifted up and down in the Z-axis direction. The base portion 88 is provided such that the second web W2 is transported on the −Z-directional side over the base portion 88.

The molded body forming unit 80 is a hot press that nips the second web W2 that is being transported between the pushing portion 87 configured to be able to be lifted up and down and the base portion 88, and applies heat to the second web W2 while pressing the second web W2. A built-in heater is provided inside the base portion 88. A built-in heater is provided inside the pushing portion 87, too. With this configuration, the molded body forming unit 80 is able to apply heat to the second web W2 nipped between the base portion 88 and the pushing portion 87. In this case, for example, as illustrated in FIG. 5, the base portion 88 has a concave portion, and the pushing portion 87 has a convex portion. The molded body forming unit 80 may form a container B that has a cavity by nipping the second web W2 that is being transported between the base portion 88 and the pushing portion 87 and by applying heat to the second web W2 while pressing the second web W2. The container B is an example of a molded body. Alternatively, for example, the molded body forming unit 80 may form a sheet S by nipping the second web W2 that is being transported between the base portion 88 and the pushing portion 87 having a concave-and-convex portion and by applying heat to the second web W2 while pressing the second web W2. With this configuration, a watermark pattern may be formed by producing a thinner portion than other portion in the sheet S.

In the foregoing embodiment, on the traveling path of the mesh belt 72, a cover for covering the −Z-directional side of the second web W2 that is being transported may be provided at each of a region between the sieve unit 60 and the third supplying unit 300 and a region between the third supplying unit 300 and the fourth supplying unit 400. With this configuration, it is possible to prevent the scattering of the additive and the powder applied to the second web W2.

In the foregoing embodiment, the number of the second supplying units 200 configured to be able to supply the powder into the transportation pipes 56 and 58 does not necessarily have to be two. For example, a plurality of second supplying units 200 may be provided on each of the transportation pipes 56 and 58, or a plurality of second supplying units 200 may be provided on either one of the transportation pipes 56 and 58. Alternatively, a single second supplying unit 200 may be provided on either one of the transportation pipes 56 and 58 such that the powder can be supplied into it.

In the foregoing embodiment, the additive supplying unit 52 may be omitted. If the additive supplying unit 52 is omitted, the additive supplied from the additive supplying unit 52 in the foregoing embodiment may be supplied from the second supplying unit 200 instead.

In the foregoing embodiment, the first supplying unit 100 does not necessarily have to include the roller 109. If the roller 109 is omitted, there is no need for the first supplying unit 100 to include the doctor blade 111, the scraping blade 113, and the cleaning blade 116. Moreover, the first supplying unit 100 does not necessarily have to include the putting-in blade 114.

In the foregoing embodiment, the drum portion 62 of the sieve unit 60 does not necessarily have to be held in the housing 61 such that it is able to rotate around the central axis of its cylindrical body. For example, the drum portion 62 may be held in the housing 61 such that it is able to swing around the central axis of its cylindrical body. In this case, the drum portion 41 is a sieve that is driven to swing by a motor. In addition, in this case, the drum portion 62 may be held swingably by the inlets 63 and 64 provided in the housing 61.

In the foregoing embodiment, the drum portion 62 of the sieve unit 60 does not necessarily have to be held rotatably in the housing 61. For example, the drum portion 62 may be held in the housing 61 such that it is able to reciprocate in the X-axis direction or the Y-axis direction. At a position on the +Z-directional side vertically below the outlet portion 108 of the first supplying unit 100, for example, the drum portion 62 may have an inlet through which the powder supplied by the first supplying unit 100 is able to pass. With this configuration, the first supplying unit 100 is able to supply the powder to the accommodating chamber 66 through the inlet of the drum portion 62 by letting the powder fall from the outlet portion 108.

In the foregoing embodiment, the web forming apparatus 1 may include two third supplying units 300. For example, on the traveling path of the mesh belt 72, one third supplying unit 300 may be provided downstream of the sieve unit 60 on the +Y-directional side in the transportation direction, and the other third supplying unit 300 may be provided upstream of the sieve unit 60 on the −Y-directional side in the transportation direction. In this case, the control unit 450 may control the third supplying unit 300 provided upstream of the sieve unit 60 in the transportation direction to let the powder supplied from the third supplying unit 300 accumulate on the mesh belt 72 in advance and may form the second web W2 by letting the mixture of the fragments P, the additive supplied from the additive supplying unit 52, the powder supplied from the second supplying units 200, and the powder supplied from the first supplying unit 100 accumulate on the mesh belt 72 on which the accumulation of the powder supplied from the third supplying unit 300 has been formed. With this configuration, it is possible to apply the powder supplied from the third supplying unit 300 to the +Z-directional-side surface of the second web W2.

In the foregoing embodiment, the third supplying unit 300 does not necessarily have to include the sieve 305. The third supplying unit 300 may be equipped with an ejection nozzle and may supply the powder onto the −Z-directional-side surface of the second web W2 by ejecting the powder from the ejection nozzle.

In the foregoing embodiment, the second web W2 may be formed by letting the mixture of the fragments P, the additive supplied from the additive supplying unit 52, the powder supplied from the second supplying units 200, and the powder supplied from the first supplying unit 100 accumulate on the mesh belt 72 of the second web forming unit 70 on which an accumulation of the powder supplied from the first supplying unit 100 has been formed in advance. In this case, by controlling the first supplying unit 100 and the sieve unit 60, the control unit 450 causes the powder to be supplied from the first supplying unit 100 to the accommodating chamber 66 of the drum portion 62 and then to accumulate on the mesh belt 72 via the drum portion 62. Then, the control unit 450 controls the transportation unit 50 and the first supplying unit 100 to supply, to the accommodating chamber 66 of the drum portion 62, the fragments P, the additive from the additive supplying unit 52, the powder from the second supplying units 200, and the powder from the first supplying unit 100. Then, the control unit 450 controls the sieve unit 60 to let the mixture of the fragments P, the additive supplied from the additive supplying unit 52, the powder supplied from the second supplying units 200, and the powder supplied from the first supplying unit 100 accumulate on the mesh belt 72 on which the accumulation of the powder supplied from the first supplying unit 100 has been formed, thereby forming the second web W2. With this configuration, it is possible to apply the powder supplied from the first supplying unit 100 to the +Z-directional-side surface of the second web W2.

What is claimed is:

1. A web forming apparatus, comprising:
   a supplying unit that supplies powder;

a drum portion that has an accommodating chamber configured to accommodate fibers, and accommodate the powder supplied from the supplying unit; and a web forming unit that forms a web by letting a mixture containing the fibers and the powder falling from the drum portion accumulate, the supplying unit including a storing chamber for storing the powder, and a roller that has an outer circumferential surface, the storing chamber having a bottom surface with a through hole, a part of the through hole being an outlet portion via which the powder goes out of the storing chamber toward the drum unit, the roller being disposed in the through hole as viewed in a vertical direction, one part of the roller being disposed within the storing chamber, a different part of the roller being disposed vertically below the through hole in the vertical direction, the roller being configured to roll and thereby cause the powder clinging to the outer circumferential surface to move from the storing chamber toward the drum portion, the drum portion having through holes formed in a peripheral surface demarcating the accommodating chamber, the powder being configured to pass through the through holes, and the outlet portion being provided vertically over the peripheral surface of the drum portion, and the supplying unit supplying the powder to the accommodating chamber through the through holes by letting the powder fall from the outlet portion.

2. The web forming apparatus according to claim 1, further comprising:

a defibrating unit performing defibration and thereby producing fibers as a defibrated material, and a transportation passage through which the fibers are transported to the accommodating chamber of the drum portion, the transportation passage being arranged downstream relative to the defibrating unit in a transport direction in which the fibers are transported.

3. The web forming apparatus according to claim 2, further comprising:

an upstream supplying unit provided on the transportation passage at a position upstream of the drum portion in the transport direction, the upstream supplying unit being configured to supply either powder that is the same as the powder supplied from the supplying unit, or powder that is different from the powder supplied from the supplying unit.

4. The web forming apparatus according to claim 1, further comprising:

a downstream supplying unit that supplies, onto a surface of the web, either powder that is the same as the powder supplied from the supplying unit, or powder that is different from the powder supplied from the supplying unit.

5. The web forming apparatus according to claim 1, further comprising:

a liquid applying unit that applies liquid to the web.

6. The web forming apparatus according to claim 1, wherein the supplying unit further includes a doctor blade that, by contact with the powder clinging to the outer circumferential surface of the roller, restricts an amount of the powder clinging to the outer circumferential surface.

7. The web forming apparatus according to claim 1, wherein the powder contains metal.

8. A molded body manufacturing apparatus, comprising:

the web forming apparatus according to claim 1; and a molded body forming unit that forms a molded body containing the fibers by applying pressure and heat to the formed web.

9. The web forming apparatus according to claim 1, further comprising a scraping blade that is arranged between the roller and the through holes of the drum portion in the vertical direction and scrapes the powder off from the outer circumferential surface.

\* \* \* \* \*